United States Patent [19]
Gerrard

[11] Patent Number: 5,141,280
[45] Date of Patent: Aug. 25, 1992

[54] SEALING SYSTEM FOR THE DOORS OF WASTE DISPOSAL VEHICLES

[75] Inventor: David A. Gerrard, Brampton, Canada

[73] Assignee: Universal Handling Equipment Company Limited, Hamilton, Canada

[21] Appl. No.: 679,405

[22] Filed: Apr. 2, 1991

[51] Int. Cl.⁵ .................................................. B60J 10/08
[52] U.S. Cl. ........................................ 296/152; 296/56; 296/146 E; 296/146 F; 49/477
[58] Field of Search ............ 296/50, 56, 146, 152, 296/154, 212; 49/477

[56] References Cited

U.S. PATENT DOCUMENTS

| | | | |
|---|---|---|---|
| 2,469,131 | 5/1949 | Ross | 49/477 |
| 3,747,275 | 7/1973 | May et al. | 49/477 |
| 3,757,969 | 9/1973 | Smith | 296/56 X |
| 3,873,149 | 3/1975 | Churchman | 296/56 |
| 4,366,977 | 1/1983 | Davis et al. | 49/477 X |
| 4,441,278 | 4/1984 | Covey, III | 49/477 |
| 4,538,951 | 9/1985 | Yeazel et al. | 296/56 X |
| 4,751,395 | 6/1988 | Centofanti | 296/56 |

FOREIGN PATENT DOCUMENTS

| | | | |
|---|---|---|---|
| 324131 | 7/1989 | European Pat. Off. | 296/146 |
| 2468715 | 5/1981 | France | 49/477 |
| 12416 | 1/1987 | Japan | 296/146 |
| 1065250 | 1/1984 | U.S.S.R. | 296/146 |
| 1245449 | 7/1986 | U.S.S.R. | 296/146 |

Primary Examiner—Margaret A. Focarino
Assistant Examiner—Andrew C. Pike
Attorney, Agent, or Firm—Rogers & Scott

[57] ABSTRACT

Waste disposal vehicles are provided with an openable door against which material received in the vehicle body is compacted by an internal ram, the load being discharged at the disposal site by the ram upon opening the door. The compression produced by the ram action expresses liquid from the waste material which pools in the body and leaks out between the butting door and body frames, the leakage increasing under the opening pressure applied by the ram and the pressurized contents, wear and damage to the frames, and relative twisting of the frames. The invention provides an economical, easily maintained and replaced sealing system comprising an expansible seal member, provided preferably on the door frame, and preferably only along the horizontal bottom edge of the door frame and the bottom portions of the two vertical sides, the sealing member thus being U-shaped and providing sufficient sealing to retain any separated liquid. Preferably the height of the vertical bottom portions is between 20% and 50% of the height of the vertical edges. Preferably the seal member is expanded by compressed air provided from a reservoir supplied from the vehicle air brake system.

10 Claims, 5 Drawing Sheets

SEALING SYSTEM FOR THE DOORS OF WASTE DISPOSAL VEHICLES

FIELD OF THE INVENTION

This invention is concerned with a new sealing system for the doors of waste disposal vehicles, such as front, rear, and side loaders and transfer trailers.

REVIEW OF THE PRIOR ART

Waste disposal vehicle are now widely used comprising a container mounted on a vehicle chassis and provided with a pair of lifting arms by which a refuse-filled bin in front of or beside the vehicle can be lifted and tilted to discharge its contents into the container interior through an opening in its top wall. The load carrying capacity of the vehicle is increased many times the volume of the emptied bins by providing a ram inside the container that is operated at intervals to compress the material towards one end and make room for more material to be added. For example, the rear end of the container may have the form of an openable door against which the material is compressed, this being opened at the disposal site to permit the compressed contents to be discharged by operation of the ram.

Many types of refuse inherently have a substantial liquid content, and this can be increased considerably if it has been wetted by rain or snow. The compression of the container contents will express a substantial portion of this liquid to form a pool at the bottom of the container. Hitherto the operators of these vehicles have not been greatly concerned with this, and in many cases may not even be aware of its extent, since the joint between the door and the container rear end has been so poorly sealed, to the extent that much if not all of the liquid has drained out while the vehicle is running, and before the disposal site is reached. Most vehicles are provided with some form of seal between the butting metal surfaces of the door and the truck body, but this may not be effective owing to separation of the surfaces by the compaction pressure applied by the ram and by the pressure of the compressed body of material that remains in contact with the door after its compression by the ram. Another factor decreasing the seal quality after a period of time is the body flexing that is encountered, and damage to the butting surfaces produced relatively quickly under the arduous conditions to which they are subjected in daily use.

It is no longer acceptable to the regulatory authorities, and to the general public, to have any of the liquid content leak from the vehicle, even though in practice it may be completely innocuous. Owing to the large size of the perimeter to be sealed, and the arduous conditions of operation referred to above, the provision of a suitable seal that will maintain adequate sealing during the operative life of the vehicle has appeared to be extremely difficult and expensive, and there has not to my knowledge to date been an adequate solution proposed.

SUMMARY OF THE INVENTION

It is the principal object of the invention therefore to provide a new sealing system for the door of a waste disposal vehicle.

It is a more specific object to provide such a sealing system that is relatively inexpensive to install and subsequently to maintain and replace as required.

In accordance with the invention there is now provided a waste disposal vehicle comprising a vehicle chassis having a container mounted thereon, the container having an access opening to its interior in a wall thereof, usually the end wall, for the waste material to be discharged therefrom, this opening being surrounded by a rectangular body frame member. A door is pivotally mounted on the container for movement between open and closed positions and comprises a rectangular door frame member which registers with the access opening frame member when the door is in the closed position. A sealing system is provided operative between the mating faces of the body and door frame members to seal the joint against escape of liquid from the container interior when the door is in the closed position, this system comprising a door frame channel member which is of U-shaped transverse cross section and is incorporated in the door frame member so as to be movable therewith. The channel member extends fully across the bottom edge of the door, but its side edge portions extend upwards from the bottom edge portion only between about 20% and 50% of the height of the two side edges of the door frame member. An expansible sealing member is disposed within the channel member, the member having a horizontal bottom portion that extends fully along the bottom edge portion of the channel member, while having vertical side portions that extend from each end of the bottom portion along the side edge portions of the channel member to the same extent as the channel side edge portions. This sealing is expansible with the door in its closed position by supply of fluid under pressure to its interior so as to make it protrude beyond the open channel face into sealing engagement with the body frame member, the sealing member thereby urging the door from the closed position toward the open position; the sealing member is retractable without such supply of fluid into the channel member so as not to protrude therefrom for protection against damage by waste material exiting through the access opening. The vehicle further comprises cooperating door locking means mounted on the container and the door and operable between them in the door closed position to lock the door to the container and to retain the door in the closed position against the opening urge of the expansible sealing member, and fluid supply means connected to the sealing member interior for controllably supplying fluid under pressure thereto.

Such a vehicle is thereby provided in an economical manner with an effective sealing system capable of preventing this undesired leakage, while being protected as far as possible against the severe conditions under which such a sealing system operates with these vehicles.

Preferably the door is mounted on the container by mounting means which in moving the door from the closed to the open position first moves the door vertically to disengage the cooperating locking means, and thereafter moves the door about a pivot axis away from the container to open the access opening.

Preferably the sealing member is continuous along its horizontal bottom portion and its two vertical side portions, and the fluid supply means supplies pressurized air to the interior of the sealing member and comprises the fluid supply means supplying compressed air to air brakes of the vehicle.

The sealing member may have a rear mounting flange and be retained in the vertical edge portions of the channel member by flanges in the channel member vertical edge portions forming vertical slots in which the mounting flange slides upon movement of the member into and out of mounted position.

DESCRIPTION OF THE DRAWINGS

A front-loading waste disposal vehicle which is a particular preferred embodiment of the invention will now be described, by way of example, with reference to the accompanying diagrammatic drawings, wherein.

DESCRIPTION OF THE PREFERRED EMBODIMENT

Figure 1:
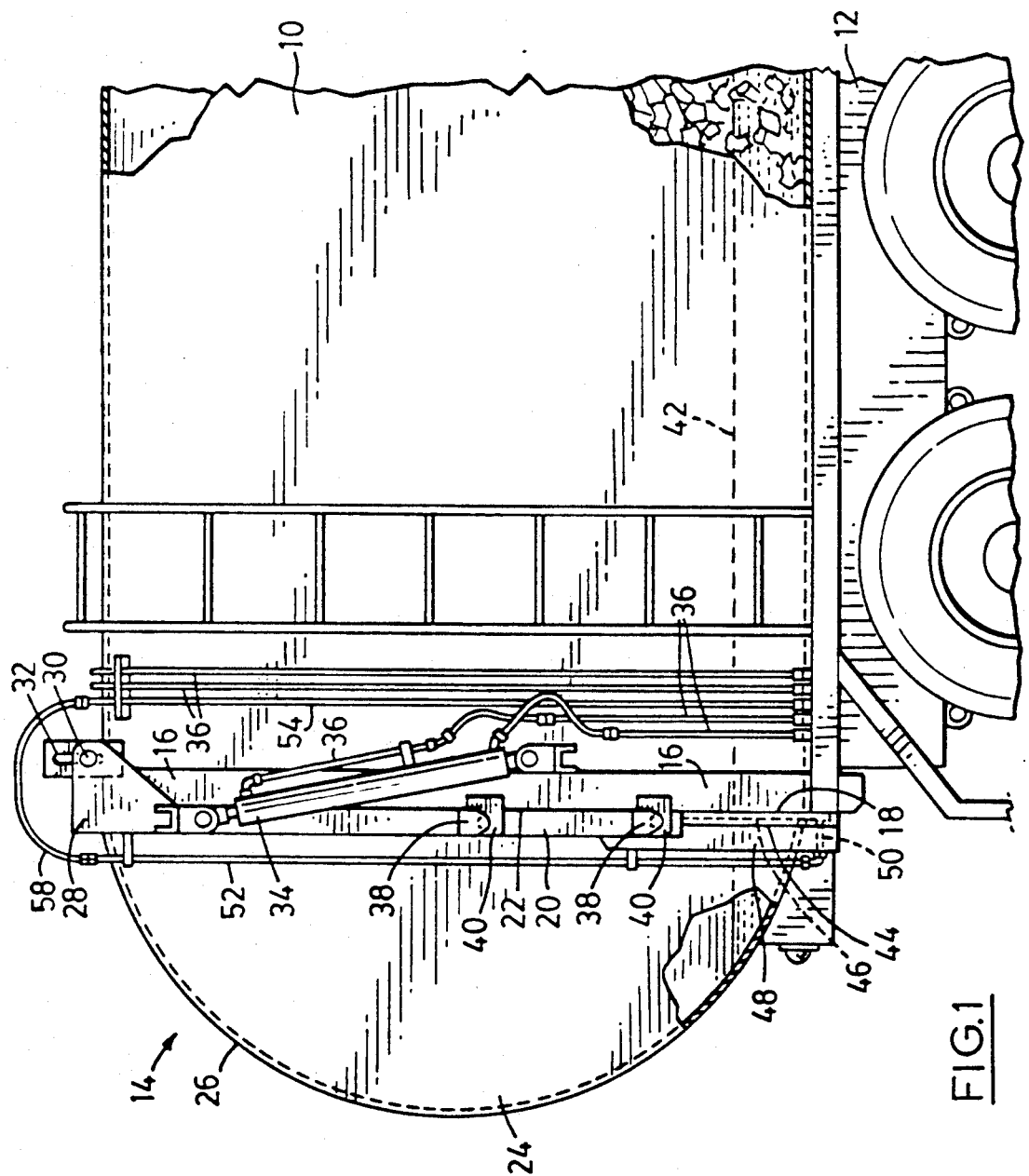
FIG. 1 is a side elevation of the rear end of the vehicle, parts of the side walls being broken away as necessary to show the interior.

For convenience the invention will be described as applied to a front-loading vehicle and its application to side and rear loading vehicles and transfer trailers will be apparent to those skilled in the art. Typically a front-loading waste disposal vehicle consists of a metal container 10 mounted on the vehicle chassis 12 and provided with a rear door 14 which will be described in greater detail below. The vehicle is provided adjacent its front end with a pair of parallel lifting arms by which waste-filled bins can be lifted from the ground and tilted to dump their contents into the container through a top opening. At intervals a ram inside the container is operated to move the received material to the rear end and compress it between the ram and the inside surface of the door. When the container is sufficiently full the vehicle is driven to a disposal area, the rear door is opened and the ram is operated to discharge the compressed material through the rear opening. None of the unnumbered elements described in this paragraph is essential to the understanding of the operation of the invention and further description and illustration thereof is therefore not required.

Typically the open rear end of the truck body is provided with a hollow rectangular frame 16 having a flat rectangular-shaped annular rear surface 18, while the door has a similar frame, the upper portion 20 of which has a flat front surface 22 that mates with the surface 18, while the lower portion is provided by sealing means of the invention to be described below. In this embodiment the side walls 24 of the door are approximately semi-circular in shape, so that the rear wall 26 is correspondingly curved and better able to withstand the forces applied to it as the material in its interior is compressed. The door is hinged to the truck body about a horizontal pivot axis at its top end by two hinges 28 having pivot pins 30 moving in vertical slots 32 to provide for corresponding vertical locking and unlocking motions, as described below.

Figure 2:
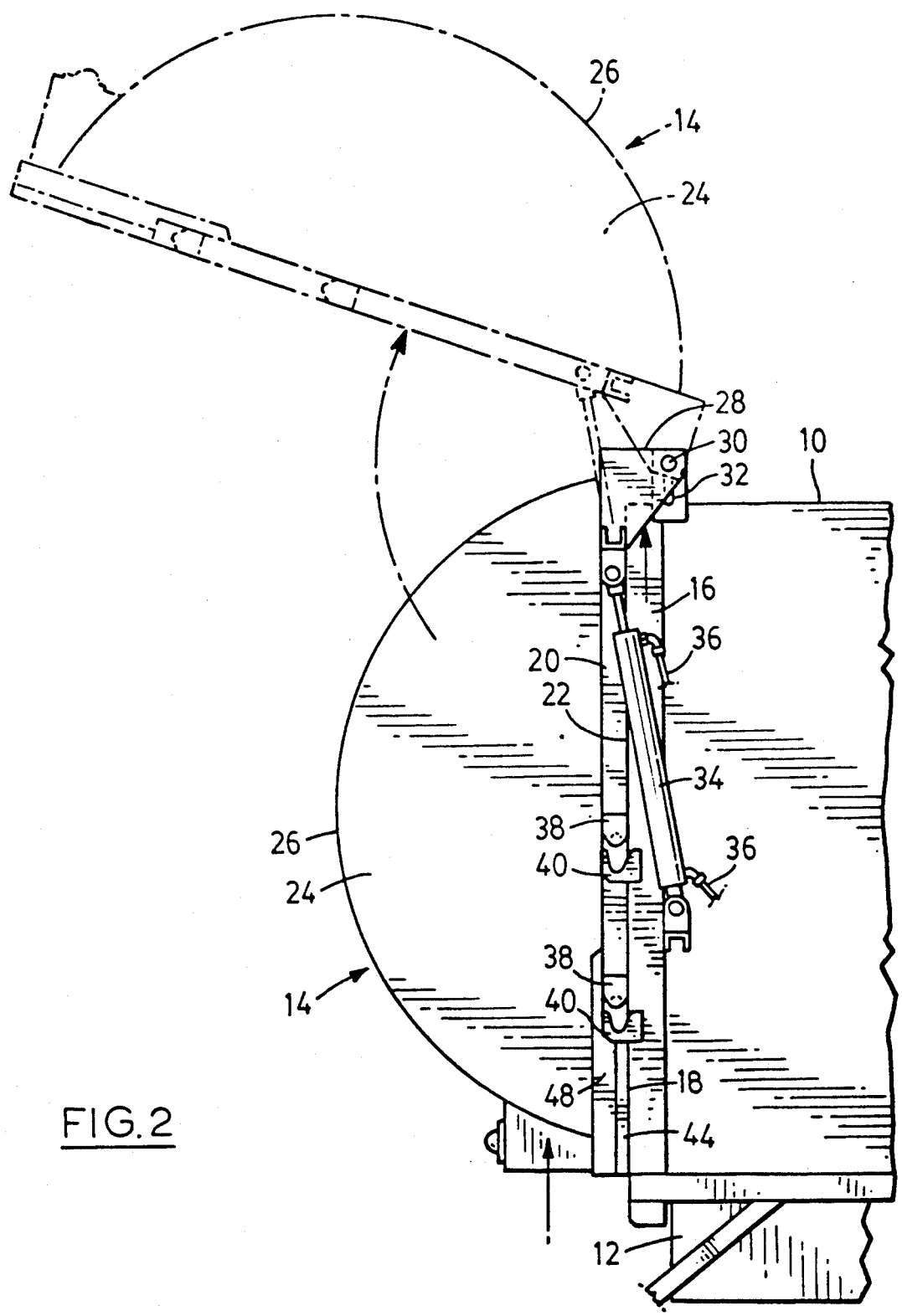
FIG. 2 is a view similar to FIG. 1 with the rear door shown in partly open position in solid lines freed from its retainers, and shown in fully open position in broken lines.
Figure 3:
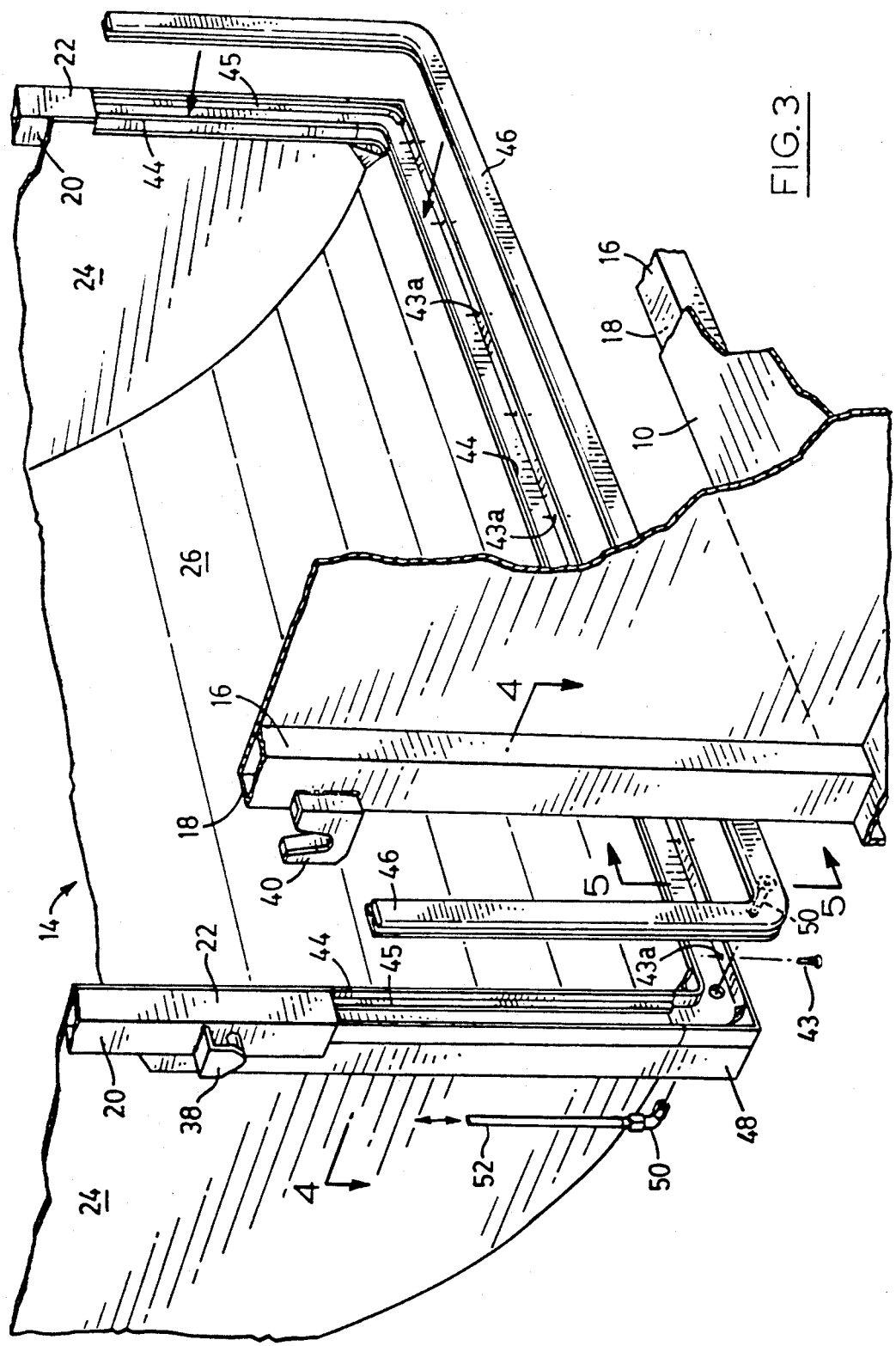
FIG. 3 is a partially exploded view of the lower end of the rear door and the adjacent portion of the truck body to show the sealing system in detail.
Figure 4:
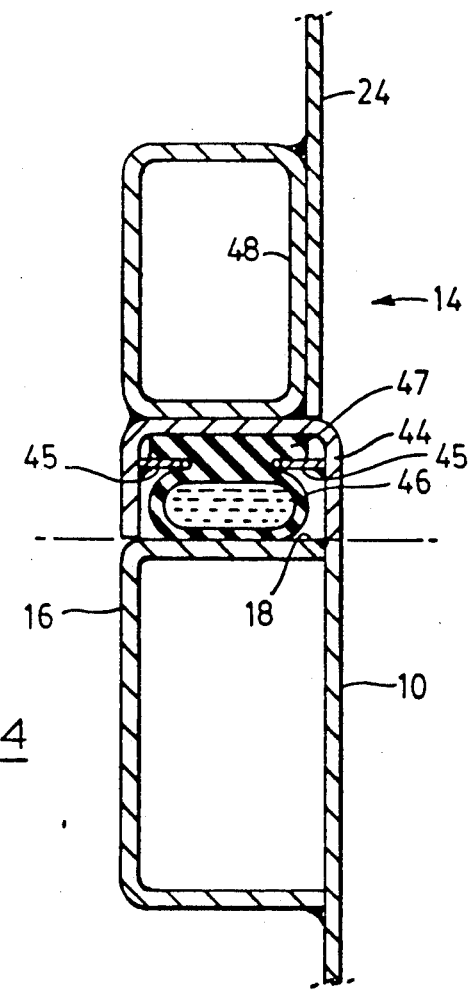
FIGS. 4 and 5 are cross-sections taken respectively on the lines 4—4 and 5—5 in FIG. 3.
Figure 5:
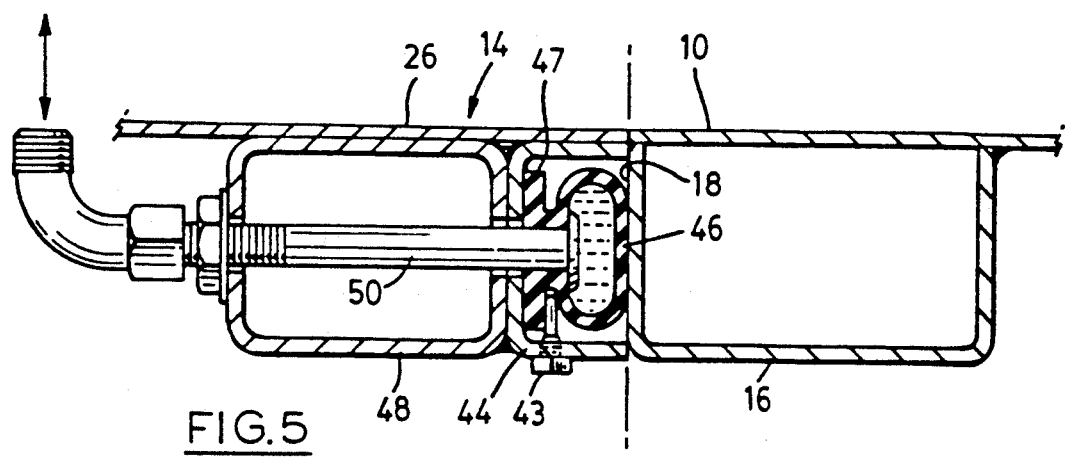

The door is held firmly and tightly in its closed position by the action of two double-acting hydraulic cylinders 34 (only one shown) on either side, each being pivoted at its lower end to the body frame 16 and at its top end to the door and being supplied with pressurised oil from a usual valve-controlled supply thereof (not shown) via pipes 36. The door is retained against the truck body rear end by sideways-extending downwardly tapered lugs 38 that engage in correspondingly tapered recesses in sideways extending brackets 40, the shapes of the lugs and recesses being such that the downwardly urging force provided by the cylinders 34 as their pistons contract into them also urges the door frame surface 22 tightly against the truck frame surface 18. To open the door the action of the cylinders 34 is reversed so that they extend in length, whereupon the door is first lifted vertically and the lugs 38 disengaged from the brackets 40, as seen in solid lines in FIG. 2. When the pivot pins 30 reach the top ends of the slots 32 further extension of the cylinders pivots the door upward to the fully open position shown in broken lines in FIG. 2.

As explained above, there is a tendency for garbage to have a high moisture content that is expressed out of the material by the pressure to which it is subjected, and this liquid pools at the bottom of the container body 10, and may if fully retained, as will happen with the new and effective sealing system of the invention, reach quite a substantial level, as indicated by the line 42 in FIG. 1. The actual quantity of separated liquid produced by a truck load of garbage, particularly wet garbage, is not likely to be realised by prior art trucks as has been described above. To obviate this leakage, in this particular embodiment, the sealing system provided in accordance with this invention is provided at the lower end of the door frame and extends only over its lower horizontal edge, and over the lower portions of its two side edges extending up from the horizontal edge. The respective portions of the hollow frame members are replaced by a forwardly-opening U-shaped channel member 44 into which fits a correspondingly U-shaped longitudinally expandable hollow seal member 46. The seal is therefore only applied to one only of the two shorter sides and for a relatively short part of the two longer vertical sides. In a typical vehicle the horizontal frame edges are about 2.4 meters (8 feet) wide and the vertical sides are about 2.4 meters (8 feet) high. The vertical sections of the seal however do not need to extend the full height and may be only from about 20% to about 50% of the height of the respective vertical sides, and preferably about 30%. In this embodiment therefore they will be from about 0.5 meters (1.6 feet) to about 1.2 meters (4 feet) in height, and preferably about 0.8 meters (2.5 feet) in height.

The channel member 44 is supported at its rear by a rigid U-shaped hollow rectangular support member 48. The ends of the seal member 46 are closed and its interior is supplied as required by pressurized air via a connecting tube 50 that passes through the support member 48, and by pipes 52 and 54 that connect to an additional resevoir 56 (FIG. 6) supplied for the purpose, this additional resevoir in turn being connected to the truck brake air supply system. The pipe 52 is mounted on the side of the door 14 and is connected to the pipe 54 on the truck body via a flexible connection 58 to permit the necessary door pivoting movement. Because of its mounting on the door, as in this preferred embodiment, the seal system is moved out of the path of the compressed material as it is discharged from the container, which would otherwise subject a seal at the mouth of the container to the possibility of damage.

Figure 6:
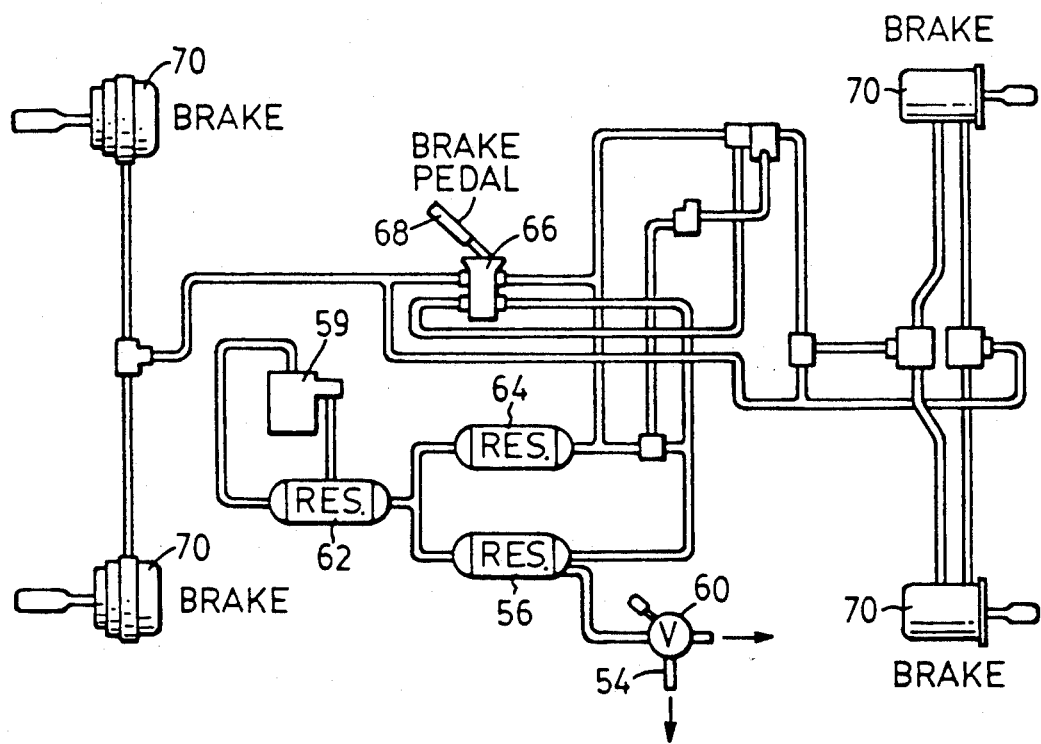
FIG. 6 is a schematic circuit diagram of the compressed air supply of the truck to show how power for the sealing system is obtained therefrom.

The brake system, as illustrated schematically in FIG. 6, is conventional for this type of vehicle and consists of a compressor 59 driven by the vehicle engine (not shown), the compressor supplying the usual supply reservoir 62 and primary reservoir 64 which are connected in series, the reservoir 56 being connected in parallel with the reservoir 64. The output from the reservoir 64 is fed to a brake foot control valve 66 operated by the brake foot pedal 68, this valve in known manner controlling the supply of the compressed air to the brake cylinders 70. The specific arrangement and operation of vehicle air brake supply and control systems is sufficiently well known to those skilled in the art that further description is not required.

The resevoir 56 is supplied constantly with air under pressure from the compressor 59, so that a suitable supply to keep the relatively small volume seal element under pressure at all times is readily available. With the seal under pressure the lugs 38 are pressed against the brackets 40 and would oppose opening movement of the door; therefore the valve (not shown) controlling the tailgate cylinders 34 and a valve 60 controlling the flow of air to the seal member are interlocked to ensure that there is no attempt to open the door while the seal is pressurised. The valve 60 is first operated to discharge the air from the seal and the tailgate is then opened; this also assures that the seal is retracted into the channel 44 during opening and closing movements of the door to protect it from damage. With the door fully closed the valve 60 is operated to pressurise the seal member, which is compressed against the surface 18 to the oval shape shown and provides a liquid-tight seal that is unaffected by any changes in the truck and door frames such as will occur with normal wear and tear in use, or by any changes in their relative orientation due to twisting of the body and due to the pressure of the ram and the compressed material. The relatively small seal member is correspondingly economical to install and subsequently maintain and replace under the arduous conditions to which such equipment is subjected in day-to-day use.

In this embodiment the hollow seal member 46 is provided with an integral backing flange 47 and the two vertical portions in the two vertical arms of the channel member 44 are retained by respective flanges 45, while the horizontal portion in the horizontal run of the channel member is retained by a plurality of transversely spaced removable pins 43, each engaged in a respective bore 43a, so that it is readily removable when repair or replacement is required by removing the pins and sliding the seal member downward out of the vertical channel arms. Although in this embodiment the seal member is pneumatically operable using compressed air, since this is the fluid most conveniently available, in other embodiments it may be hydraulically operated using a pressurized liquid, such as an oil.

In the preferred embodiment described the sealing system is applied to the frame of the movable tailgate, and preferably will be applied to the equivalent movable door of any other kind of waste disposal vehicle; it can also be applied to the body frame if this is possible without unacceptable danger of damage. In other embodiments the sealing system may extend the full height of the body and may also include the horizontal top edge, or its equivalent. The shape of the sealing member will be dictated by the shapes of the body and door frames between which it is interposed, and may for example be circular, when the lower chordal segment will be the functional equivalent of the lower horizontal edge of a rectangle, and the two side chordal segments will be the functional equivalent of the two vertical edges of a rectangle.

I claim:

1. A waste disposal vehicle comprising a vehicle chassis having mounted thereon a closable container, the container having in a wall thereof an access opening to an interior for entry of waste material thereto and discharge of the waste material therefrom;

the container comprising a rectangular body frame member having top, bottom, and side edges and a rectangular outer face surface surrounding the access opening;

the container further having mounted thereon for corresponding movement about a pivot axis between open and closed positions a closable and openable door which respectively opens and closes the access opening, the door comprising a rectangular door frame member having top, bottom, and side edges and a rectangular outer face surface;

the door in the closed position having the rectangular outer face surface thereof registering with and mating with the rectangular outer face surface of the body frame member;

the vehicle also comprising a sealing system operative between the mating rectangular outer faces of the body and door frame members to seal a joint between them against escape of liquid from the container interior when the door is in the closed position;

the sealing system comprising a door frame channel member having an open channel face, having a bottom edge portion, and having two side edge portions connected to the bottom edge portion, the channel member being of U-shaped transverse cross section and being incorporated in the door frame member so as to be movable therewith, the channel member bottom edge portion extending along the bottom edge of the door frame member and the channel member side edge portions extending upwards from the bottom edge portion only between about 20% and 50% of a height of the two side edges of the door frame member, the channel member having the open channel surface facing the body frame member outer surface and registering with the body frame member outer surface when the door is in the closed position;

the sealing system also comprising an expansible sealing member disposed within the channel member, the sealing member having a horizontal bottom portion that extends along the bottom edge portion of the channel member, and having vertical side portions that extend from each end of the bottom portion along the side edge portions of the channel member to the same extent as said channel side edge portions;

the sealing member being expansible with the door in the closed position by supply of fluid under pressure to the interior thereof to protrude beyond the open channel face into sealing engagement with the body frame member outer surface, the sealing member thereby urging the door from the closed position toward the open position;

the sealing member being retractable without such supply of the fluid into the channel member so as not to protrude therefrom for protection against damage by the waste material exiting through the access opening;

the vehicle further comprising cooperating door locking means mounted on the container and the door and operable between them in the door closed position to lock the door to the container and to retain the door in the closed position against said urging of the expansible sealing member;

and the vehicle further comprising fluid supply means connected to the sealing member interior for controllably applying the fluid under pressure thereto.

2. A vehicle as claimed in claim 1, wherein the door is mounted on the container by mounting means which in moving the door from the closed to the open position first moves the door vertically to disengage the cooperating locking means, and thereafter moves the door about the pivot axis away from the container to open the access opening.

3. A vehicle as claimed in claim 2, wherein the expansible sealing member is continuous along the horizontal bottom portion and the two vertical side portions.

4. A vehicle as claimed in claim 2, wherein the fluid supply means supplies pressurized air to the interior of the expansible sealing member and comprises fluid supply means supplying compressed air to air brakes of the vehicle.

5. A vehicle as claimed in claim 2, wherein the expansible sealing member has a rear mounting flange and is retained in the side edge portions of the channel member by flanges in the channel member side edge portions forming vertical slots in which the mounting flange slides upon movement of the sealing member into and out of mounted position.

6. A vehicle as claimed in claim 5, wherein the expansible sealing member is retained in the channel member against vertical movement out of the mounted position by a plurality of vertically extending transversely spaced pins in the channel member bottom edge portion.

7. A vehicle as claimed in claim 1, wherein the expansible sealing member is continuous along the horizontal bottom portion and the two vertical side portions.

8. A vehicle as claimed in claim 1, wherein the fluid supply means supplies pressurized air to the interior of the expansible sealing member and comprises fluid supply means supplying compressed air to air brakes of the vehicle.

9. A vehicle as claimed in claim 1, wherein the expansible sealing member has a rear mounting flange and is retained in the side edge potions of the channel member by flanges in the channel member side edge portions forming vertical slots in which the mounting flange slides upon movement of the sealing member into and out of mounted position.

10. A vehicle as claimed in claim 9, wherein the expansible sealing member is retained in the channel member against vertical movement out of the mounted position by a plurality of vertically extending transversely spaced pins in the channel member bottom edge portion.

* * * * *